Oct. 4, 1932. G. H. DECKER ET AL 1,880,866
CLUTCH CONTROL
Filed July 9, 1931
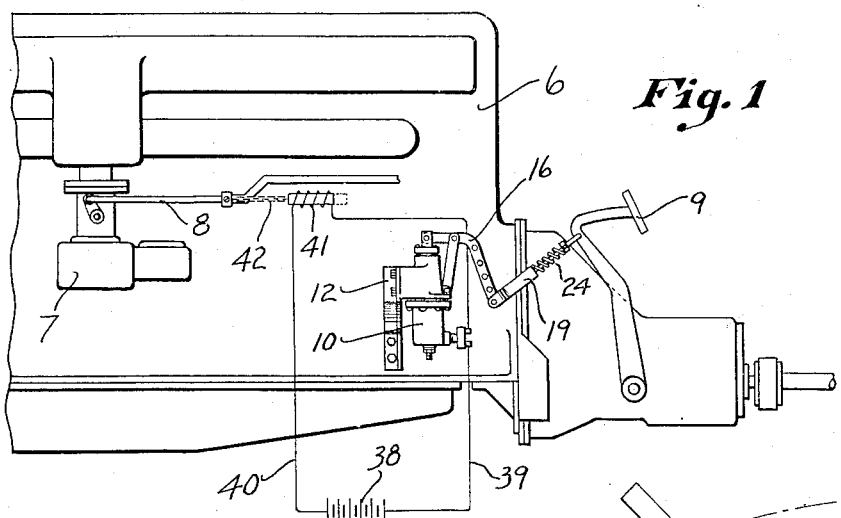
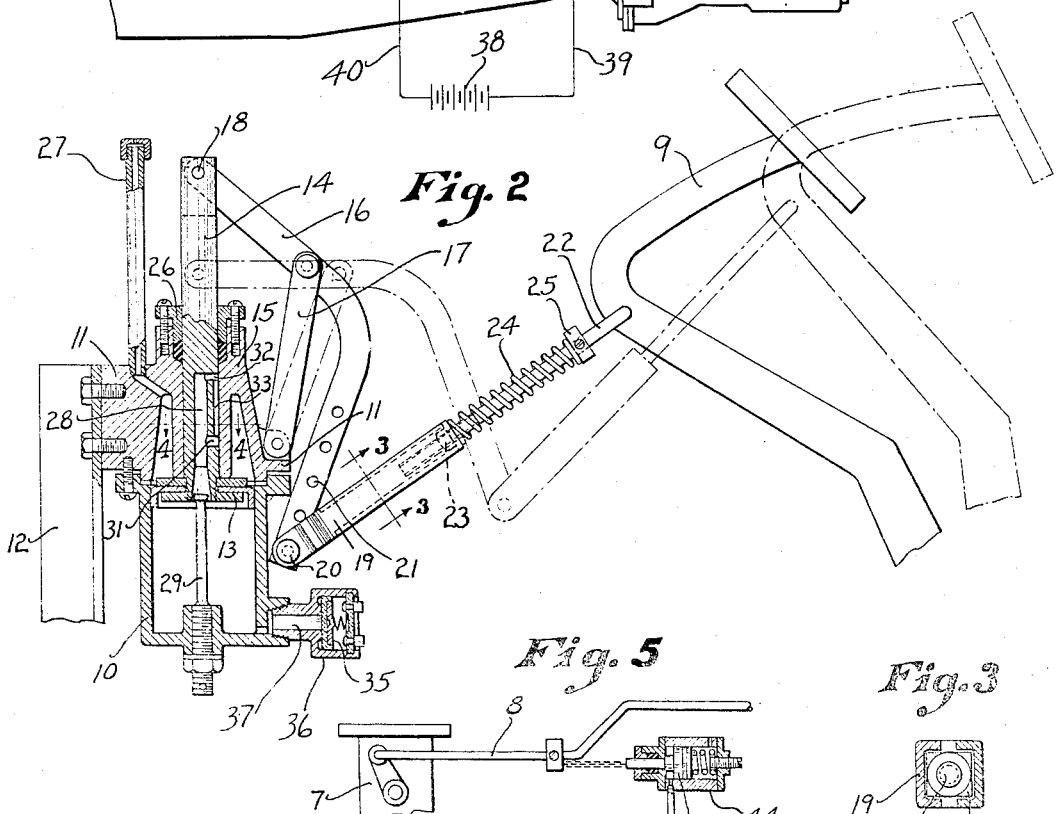
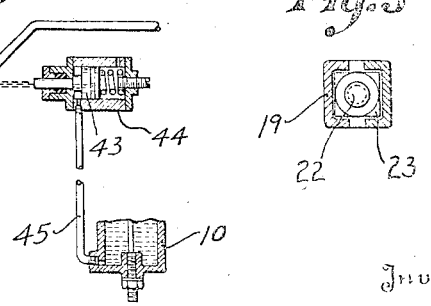
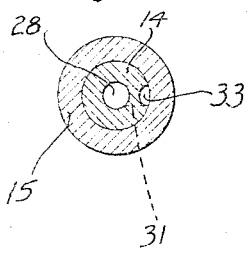
Inventors
Grover H. Decker
Homer A. Decker
Owen & Owen
Attorneys Patented Oct. 4, 1932

1,880,866

UNITED STATES PATENT OFFICE

GROVER H. DECKER AND HOMER A. DECKER, OF TOLEDO, OHIO

CLUTCH CONTROL

Application filed July 9, 1931. Serial No. 549,724.

This invention relates to a clutch control which is intended primarily for use in automobiles.

In starting an automobile or in shifting gears, it is difficult for a novice and, under certain conditions, even for an experienced driver to let the clutch into engagement without jerking. It is an object of the present invention to overcome such difficulty by providing an automatic clutch control for gradually engaging the clutch. In the preferred form of the invention, provision is also made for gradually opening the throttle automatically in synchronism with the engagement of the clutch and for subsequently restoring the manual control of the throttle.

The invention is also of the utmost importance in effecting a smooth operation of the clutch when the latter is automatically controlled that is, when the clutch is arranged for automatic release when the engine is idling and for automatic engagement when the engine is speeded up.

The invention, in its present embodiment, will be more particularly described in connection with the accompanying drawing, in which—

Figure 1 is a side elevation of the invention in connection with an automobile engine;

Figure 2 is a central enlarged longitudinal section through the control mechanism;

Figure 3 is a detail sectional view taken on line 3—3 of Fig. 2;

Figure 4 is a detail sectional view taken on the line 4—4 of Fig. 2; and

Figure 5 is a diagrammatic view illustrating a modified form of the throttle control means.

The invention is illustrated in connection with an automobile engine 6 having a carburetor 7, a throttle control rod 8 and a clutch pedal 9. It comprises a cylinder 10 provided with a head 11 and filled with oil or other liquid. A suitable support 12 for the cylinder is mounted on the engine 6. A piston 13 is mounted for reciprocation in the cylinder 10 and is provided with a stem 14 which extends through the head 11 of the cylinder, said head being provided with an extension 15 within which the stem 14 is guided for reciprocation.

The mechanism connecting the piston 13 with the clutch pedal 9 includes a lever 16 fulcrumed on a link 17 which is connected to the head 11. One end of the lever is pivotally connected at 18 to the stem 14 and the other end of the lever is connected to one end of a clevis 19 by a pivot pin 20 which may be inserted in any one of a number of holes 21 to vary the throw of the piston as compared to the movement of the clutch pedal. The clevis 19 has a lost motion connection with the clutch pedal 9, comprising a rod 22 pivotally connected at one end to the pedal and having its other end slidable in the end of the clevis and provided with a nut 23 which is non-rotatably held within the clevis. A coil spring 24 is seated between the head of the clevis and a collar 25 secured to the rod 22. The spring is adapted to yield to permit the clutch pedal to be suddenly depressed to throw out the clutch and gradually expands as the piston responds to this movement.

The stem 14 is surrounded by a packing gland 26 and the cylinder is kept full of liquid which is introduced through a stand pipe 27. The cup of the piston 13 permits liquid to pass from the upper to the lower part of the cylinder 11 as the piston moves upwardly but upon the down stroke of the piston the liquid must pass from the cylinder 11 through a bore 28 in the piston stem. This flow is restricted by a metering valve or spindle 29 which extends into the bore and, because of the taper 30 at the outer end of the bore, there will at first be an increasing restriction of the flow as the clutch pedal is released, then a very slow movement until the clutch is engaged, at which time the head of the valve 29 passes a port 31. The movement of the piston will then be comparatively rapid since the liquid will then flow through the port 32, groove 33 and port 31 to the other side of the piston.

The lost motion connection and the spring 28 between the pedal 9 and lever 16, permit the clutch to be fully and quickly disengaged by depression of the clutch pedal, without regard to the movement of the piston. Upon releasing the clutch pedal when the piston is in the position shown in Fig. 2, the completion of the return movement of the pedal and the engagement of the clutch is permitted only as fast as the piston 13 moves downwardly while the liquid flows from the cylinder 10 past the metering valve 29 in the bore 28. Upon disconnecting the clevis from the lever, the nut 23 may be adjusted longitudinally of the rod 22 to allow for proper engagement of the clutch and to compensate for wear thereof. The valve 29 may be adjusted longitudinally to provide the necessary restriction to the engagement of the clutch to insure the same against jerking. When the proper adjustments are made, the driver may remove his foot from the clutch pedal and the clutch will automatically be let into engagement by a gradual steady movement, such as it is impossible to obtain by human control.

In the preferred form of the invention, provision is also made for automatically opening the throttle just before engagement of the clutch takes place. For this purpose, a fluid pressure switch 35 is mounted within a housing 36 and is in communication with the cylinder 10 through the port 37. Thus, whenever the piston 13 is forced downwardly as the pedal 9 is released the switch 35 is closed. One terminal of the battery 38 is connected through a line 39 with one of the switch terminals and the other terminal of the battery is connected through a line 40 to the other switch terminal. The line 40 includes a solenoid 41, the core of which is connected by a flexible connection 42 with the throttle rod 8. Thus, as the pressure in the cylinder 10 closes the switch 35, the solenoid is energized to open the throttle, but just as soon as the pressure is relieved the switch opens, de-energizing the solenoid and restoring the manual control of the throttle.

In the modification shown in Fig. 5, instead of a solenoid, the throttle control rod 8 is connected to a piston 43 mounted within the cylinder 44 and operated directly by fluid pressure through a tube 45 connecting the two cylinders 44 and 10.

From the foregoing description, it will be seen that we have provided an automatic clutch control by which, if it is properly adjusted, the clutch will always be gradually engaged in exactly the same manner, without any necessity for care or skill on the part of the driver. The engagement of the clutch and the acceleration of the car will always be effected in the most perfect manner, when the various adjustments have been properly made.

Although we have shown and described the invention in detail, it is apparent that various features may be considerably modified without departing from the scope of the invention as claimed.

What we claim is:

1. In a clutch control, the combination with the clutch pedal and the throttle, of a cylinder adapted to contain liquid, a piston reciprocable in said cylinder and operatively connected with the clutch pedal, means affording free transference of liquid past the piston as it is moved in one direction, means affording a restricted transference of liquid past the piston as it moves in the opposite direction, and means controlled by movement of the piston in the last mentioned direction to automatically open the throttle.

2. In a clutch control, the combination with the clutch pedal and the throttle, of a cylinder adapted to contain liquid, a piston reciprocable in said cylinder as the pedal is moved to cause engagement and disengagement of the clutch, means associated with said piston to retard movement of the pedal to engage the clutch but permitting free movement of the pedal to disengage the clutch, and means controlled by liquid pressure as the clutch is moved into engagement to automatically open the throttle.

3. In a clutch control, the combination with the clutch pedal and the throttle, of a cylinder adapted to contain liquid, a piston reciprocable in said cylinder and operatively connected with the clutch pedal, said piston having a passageway for transference of liquid from one side to the other thereof, adjustable means to restrict the rate of flow through said passageway, and means, controlled by movement of the piston in the direction to cause engagement of the clutch, to automatically open the throttle.

4. In a clutch control, the combination with the clutch pedal and the throttle, of a cylinder adapted to contain liquid, a piston having free movement in one direction in said cylinder and restricted movement in the opposite direction, means operatively connecting the piston with the clutch pedal, said piston having a passageway for transference of liquid from one side to the other thereof, means causing an increasing restriction to the flow through said passageway as the piston moves in the direction to cause engagement of the clutch, and means controlled by movement of the piston in the last mentioned direction to automatically open the throttle.

5. In a clutch control, the combination with the clutch pedal and the throttle, of a cylinder adapted to contain liquid, a piston reciprocable in said cylinder and operatively connected with the clutch pedal, said piston having a hollow stem with ports therein, a longitudinally adjustable spindle in said housing in position to enter said stem and restrict the flow therethrough as the clutch is moved toward engagement, and means to automatically open the throttle as the clutch is moved toward engagement.

6. In a clutch control, the combination with the clutch pedal and the throttle, of a cylinder adapted to contain liquid, a piston reciprocable in said cylinder and operatively connected with the clutch pedal, said piston having a stem with a bore tapered for a portion of its length and provided with ports, a headed spindle within said housing in position to enter the bore and cause an increasing restriction to the flow therethrough as the clutch is moved toward engagement, and means for automatically opening the throttle as the clutch is moved toward engagement.

7. In a clutch control, the combination with the clutch pedal and the throttle, of a cylinder adapted to contain liquid, means controlled by fluid pressure within the cylinder to retard movement of the clutch into engagement and means operable at the same time by fluid pressure to open the throttle.

8. In a clutch control, the combination with the clutch pedal and the throttle, of a cylinder adapted to contain liquid, means controlled by fluid pressure within the cylinder to retard movement of the clutch into engagement, a solenoid operable, when energized, to open the throttle, and a pressure switch, operable by fluid pressure developed by movement of the clutch toward engagement, to energize said solenoid.

In testimony whereof we have hereunto signed our names to this specification.

GROVER H. DECKER.
HOMER A. DECKER.